US008805348B2

(12) United States Patent  
Matsuoka

(10) Patent No.: US 8,805,348 B2
(45) Date of Patent: Aug. 12, 2014

(54) DIARY SYNCHRONIZATION FOR SMART PHONE APPLICATIONS

(75) Inventor: Yoshimichi Matsuoka, Cupertino, CA (US)

(73) Assignee: QUALCOMM Incorporated, San Diego, CA (US)

(*) Notice: Subject to any disclaimer, the term of this patent is extended or adjusted under 35 U.S.C. 154(b) by 442 days.

(21) Appl. No.: 12/182,873

(22) Filed: Jul. 30, 2008

(65) Prior Publication Data

US 2010/0029294 A1 Feb. 4, 2010

(51) Int. Cl.
*H04M 3/00* (2006.01)
*H04W 4/02* (2009.01)
*H04W 64/00* (2009.01)
*H04W 88/02* (2009.01)
*H04M 3/42* (2006.01)
*G06Q 30/02* (2012.01)

(52) U.S. Cl.
CPC ............... *H04W 4/02* (2013.01); *H04W 4/021* (2013.01); *H04W 4/023* (2013.01); *H04W 4/025* (2013.01); *H04W 4/027* (2013.01); *H04W 64/006* (2013.01); *H04W 88/02* (2013.01); *H04M 3/42348* (2013.01); *H04M 2242/14* (2013.01); *G06Q 30/02* (2013.01)
USPC ................. 455/418; 455/412.1; 455/412.2; 455/414.1; 455/414.2; 455/414.3; 455/414.4; 455/456.1; 455/456.3; 455/457

(58) Field of Classification Search
CPC ....... H04W 4/02; H04W 4/021; H04W 4/023; H04W 4/027; H04W 4/12; H04W 88/02; H04W 4/025; H04W 64/006; H04M 2242/30; H04M 3/42348; H04M 2242/14; G06Q 30/02

USPC .......... 455/66.1, 74, 90.3, 344, 404.1, 404.2, 455/412.1, 412.2, 414.1, 414.2, 414.3, 455/414.4, 456.1–457, 550.1, 556.1, 556.2, 455/563, 566, 418, 419, 456.3, 456.6, 558; 340/539.1, 539.11; 709/206, 207, 217, 709/219; 715/702

See application file for complete search history.

(56) References Cited

U.S. PATENT DOCUMENTS

| 5,521,589 | A | 5/1996 | Mondrosch et al. |
| 6,879,970 | B2 | 4/2005 | Shiffman et al. |
| 6,879,997 | B1 * | 4/2005 | Ketola et al. .................. 709/208 |

(Continued)

FOREIGN PATENT DOCUMENTS

| CN | 101185315 | 5/2008 |
| EP | 1447949 | 8/2004 |

OTHER PUBLICATIONS

International Search Report and Written Opinion of International Application No. PCT/US2009/047186, mail date Nov. 26, 2009, 7 pages.

(Continued)

*Primary Examiner* — Olumide T Ajibade Akonai
(74) *Attorney, Agent, or Firm* — Mahamedi Paradice LLP

(57) ABSTRACT

A mobile communication device configured to communicate over a wireless network is further configured to generate detectable events in response to activities of a user of the mobile communications device. Underlying user activities are identified from the detected events. Personalized electronic diary entries are generated from the identified activities as indications of a user activity related to the detected event. The personalized electronic diary entries can be stored in a user retrievable collection.

20 Claims, 8 Drawing Sheets

(56) References Cited

U.S. PATENT DOCUMENTS

| | | |
|---|---|---|
| 7,084,758 B1 * | 8/2006 | Cole ..................... 340/539.11 |
| 7,415,447 B2 | 8/2008 | Shiffman et al. |
| 7,499,715 B2 * | 3/2009 | Carro et al. ............... 455/456.3 |
| 7,606,866 B2 * | 10/2009 | Mora ........................... 709/207 |
| 7,778,632 B2 * | 8/2010 | Kurlander et al. ............ 455/418 |
| 2002/0143563 A1 | 10/2002 | Hufford et al. |
| 2004/0093380 A1 * | 5/2004 | Sellen et al. ................. 709/204 |
| 2005/0202934 A1 | 9/2005 | Olrik et al. |
| 2007/0099602 A1 | 5/2007 | Kurlander et al. |
| 2008/0055427 A1 | 3/2008 | Wendelrup |
| 2008/0125959 A1 | 5/2008 | Doherty |
| 2008/0162555 A1 * | 7/2008 | Schuler et al. ............. 707/104.1 |
| 2008/0171573 A1 * | 7/2008 | Eom et al. .................. 455/556.2 |
| 2009/0177476 A1 * | 7/2009 | Darrell et al. ................. 704/275 |

OTHER PUBLICATIONS

UKIPO, Examination Report dated Nov. 21, 2012, GB Pat App. No. 1100492.6, filed Jun. 12, 2009.

Supplementary European Search Report—EP09803313, Search Authority—The Munich, Jun. 4, 2014.

* cited by examiner

DIARY SYNCHRONIZATION FOR SMART PHONE APPLICATIONS

FIELD

The devices and processes described herein relate generally to the field of electronic diaries, and more particularly to automatic generation of electronic diary entries responsive to user activity.

BACKGROUND

Individuals often strive to keep track of what they did or what they plan to do. To this end, some individuals maintain a calendar or a diary. By handling such information with care, such a schedule or diary can provide an individual with several benefits, such as tracking their activities throughout any given day. Having captured such activity, the individual can make determinations, such as spending habits, exercise performance, maintaining a dietary record of foods eaten, and annual percentage of travel. Currently, digital schedulers, such as OUTLOOK® Calendar allow an individual to keep track of occasions initiated by human input. Namely, if an individual wants to track what he or she did on any given day, the user has to initiate input of information descriptive of the activity in some manner in order to maintain a diary. Such information typically includes a date, time, duration, and description of the activity.

Many individuals find such schedule/diary applications quite useful for keeping track of future planned events, and for later review of previously planned events as a record of one's activity. Unfortunately, such applications rely on direct user initiated input. Thus, current schedulers can maintain a record of only those meetings and other occasions specifically entered or otherwise described by the user, but nothing else. If a user wants to record, book, or plan something, the user has to do it manually. Thus, the resulting record maintained by any schedule/diary is as good as the input initiated by the user.

People often forget what they did yesterday. Should a user initiating diary entries overlook an activity, it will not be captured in the scheduler/diary. Thus, from later review, it would be as if the activity never happened. For individuals that maintain busy schedules, it is quite likely they may not have time to initiate input for all of their activities performed in any given day. Thus, later review of a diary input for that day would have "holes" of unaccounted time.

BRIEF DESCRIPTION OF THE DRAWINGS

The invention is described in more detail referring to the advantageous embodiments presented as examples and to the attached drawings, in which.

DETAILED DESCRIPTION OF THE PREFERRED EMBODIMENTS

Devices and processes are described herein for automatically generating a daily record of activities, such as a journal or diary for tracking at least one of business and private activities associated with a wireless electronic portable device user. Some embodiments described herein may provide a process for generating a personalized electronic diary entry for a user of a wireless portable electronic device. Such a process includes detection of at least one event related to an activity of the device user. The related activity of the user is identified at least in part from the detected event. A personalized electronic diary entry can be generated indicative of the related activity of the user.

In some embodiments, a mobile communications device configured for maintaining a diary includes at least one activity sensor. The activity sensor is configured to generate an event in response to a respective activity of the user of the mobile communications device. The device also includes an event detector in communication with the at least one activity sensor. The event detector is configured to detect generated events. An activity identifier is provided in communication with the event detector for identifying a related user activity in response to detecting a generated event. A diary record generator in communication with the activity identifier is also provided. The diary record generator is configured to generate a personalized electronic diary entry indicative of the related user activity.

Figure 1:
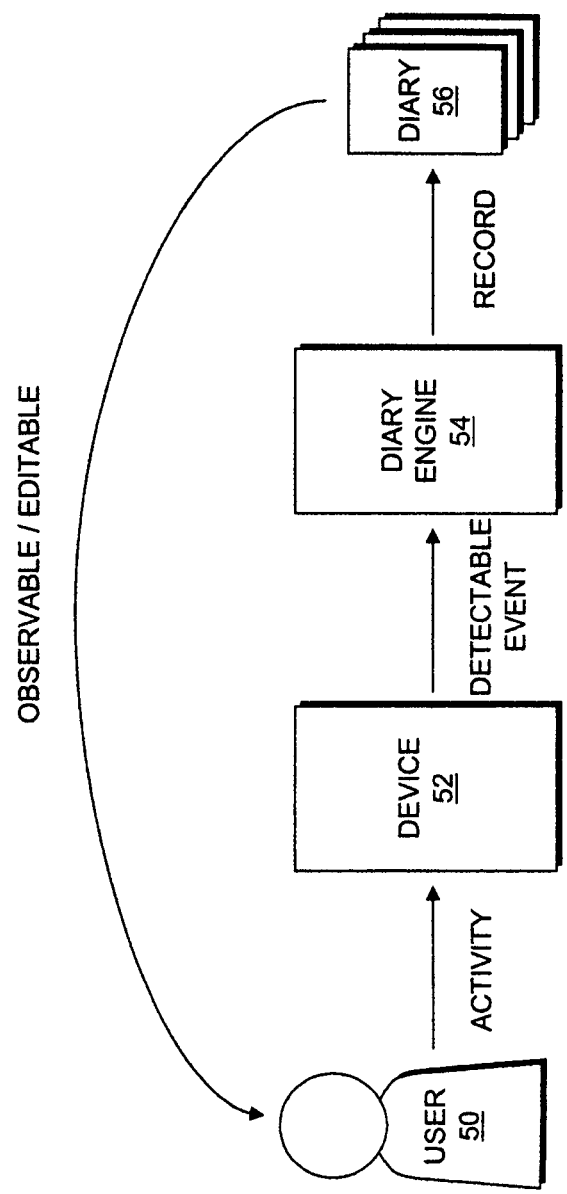
FIG. 1 is a schematic diagram of an exemplary embodiment of a system and process for generating a diary, according to an exemplary embodiment.

Referring first to FIG. 1, a user 50 performs an activity that generates an event on a wireless electronic portable device 52. The generated event is indicative of the activity associated with the user of the device 52. A diary engine 54 monitors or otherwise detects the event generated by the device 52. The diary engine 54 also identifies relevant activity of the user of the device related to the detected event. The diary engine 54 then generates a diary entry indicative of the identified activity stored in a user-retrievable diary 56, without requiring initiation by human input that in any way directly relates to the activity. The user-retrievable diary 56 provides a valuable tool to the user. In some embodiments, the user-retrievable diary 56 is editable by the user to add information, remove information, or otherwise modify diary entries, whether generated automatically or otherwise.

Figure 2:
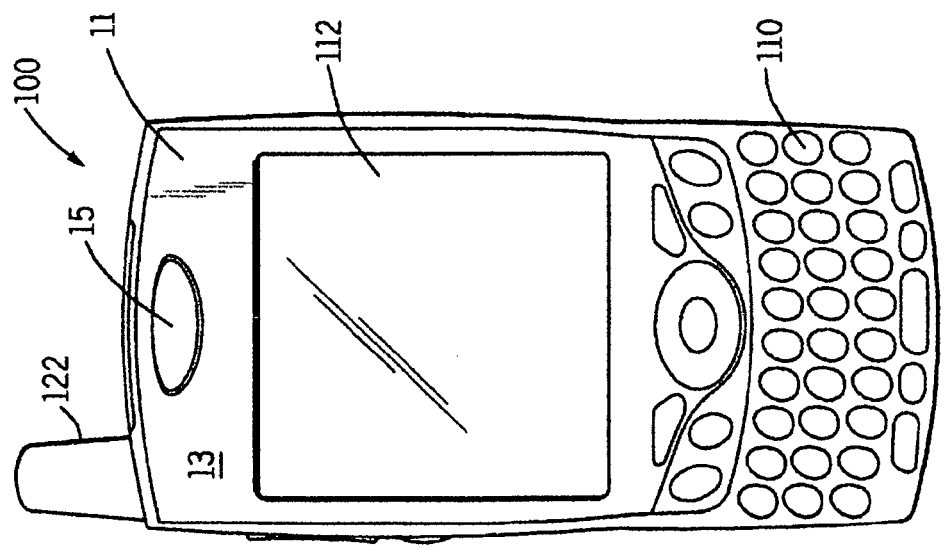
FIG. 2 is a front view of a mobile communication device, according to an exemplary embodiment.

Referring next to FIG. 2, a mobile computing device 100 is shown. Device 100 is a smart phone, which is a combination mobile telephone and handheld computer having personal digital assistant functionality. The teachings herein can be applied to other mobile computing devices (e.g., a laptop computer) or other electronic devices (e.g., a desktop personal computer, etc.). Personal digital assistant functionality can comprise one or more of personal information management, database functions, word processing, spreadsheets, voice memo recording, etc. and is configured to synchronize personal information from one or more applications with a computer (e.g., desktop, laptop, server, etc.). Device 100 is further configured to receive and operate additional applications provided to device 100 after manufacture, e.g., via wired or wireless download, SecureDigital card, etc.

Figure 3:
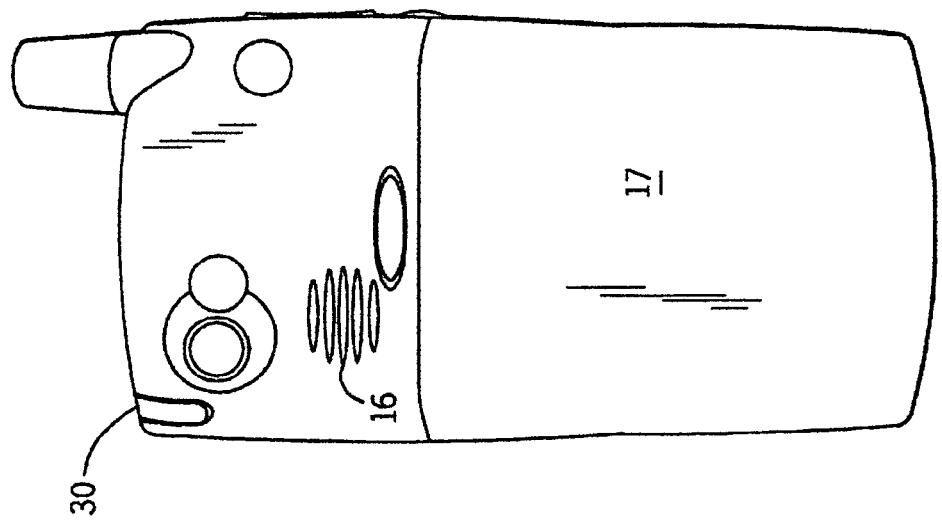
FIG. 3 is a back view of a mobile communication device, according to an exemplary embodiment.

Device 100 comprises a housing 11 having a front side 13 and a back side 17 (FIG. 3). An earpiece speaker 15, a loudspeaker 16 (FIG. 3), and a user input device 110 (e.g., a plurality of keys 110) are coupled to housing 11. Housing 11 is configured to hold a screen in a fixed relationship above a user input device 110 in a substantially parallel or same plane. This fixed relationship excludes a hinged or movable relationship between the screen and plurality of keys in the fixed embodiment. Device 100 may be a handheld computer, which is a computer small enough to be carried in a typical front pocket found in a pair of pants, comprising such devices as typical mobile telephones and personal digital assistants, but excluding typical laptop computers and tablet PCs. In alternative embodiments, display 112, user input device 110, earpiece 15 and loudspeaker 16 may each be positioned anywhere on front side 13, back side 17, or the edges therebetween.

In various embodiments device 100 has a width (shorter dimension) of no more than about 200 mm or no more than about 100 mm. According to some of these embodiments, housing 11 has a width of no more than about 85 mm or no more than about 65 mm. According to some embodiments, housing 11 has a width of at least about 30 mm or at least about 50 mm. According to some of these embodiments, housing 11 has a width of at least about 55 mm.

In some embodiments, housing 11 has a length (longer dimension) of no more than about 200 mm or no more than about 150 mm. According to some of these embodiments, housing 11 has a length of no more than about 135 mm or no more than about 125 mm. According to some embodiments, housing 11 has a length of at least about 70 mm or at least about 100 mm. According to some of these embodiments, housing 11 has a length of at least about 110 mm.

In some embodiments, housing 11 has a thickness (smallest dimension) of no more than about 150 mm or no more than about 50 mm. According to some of these embodiments, housing 11 has a thickness of no more than about 30 mm or no more than about 25 mm. According to some embodiments, housing 11 has a thickness of at least about 10 mm or at least about 15 mm. According to some of these embodiments, housing 11 has a thickness of at least about 50 mm.

In some embodiments, housing 11 has a volume of up to about 2500 cubic centimeters and/or up to about 1500 cubic centimeters. In some of these embodiments, housing 11 has a volume of up to about 1000 cubic centimeters and/or up to about 600 cubic centimeters.

While described with regards to a handheld device, many embodiments are usable with portable devices which are not handheld and/or with non-portable devices/systems.

Device 100 may provide voice communications functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, etc.

In addition to voice communications functionality, device 100 may be configured to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, etc.

Device 100 may be configured to provide voice and/or data communications functionality through wireless access points (WAPs) in accordance with different types of wireless network systems. A wireless access point may comprise any one or more components of a wireless site used by device 100 to create a wireless network system that connects to a wired infrastructure, such as a wireless transceiver, cell tower, base station, router, cables, servers, or other components depending on the system architecture. Examples of wireless network systems may further include a wireless local area network (WLAN) system, wireless metropolitan area network (WMAN) system, wireless wide area network (WWAN) system (e.g., a cellular network), and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, a wireless personal area network (PAN) system, such as a Bluetooth® system operating in accordance with the Bluetooth Special Interest Group (SIG) series of protocols.

Figure 4:
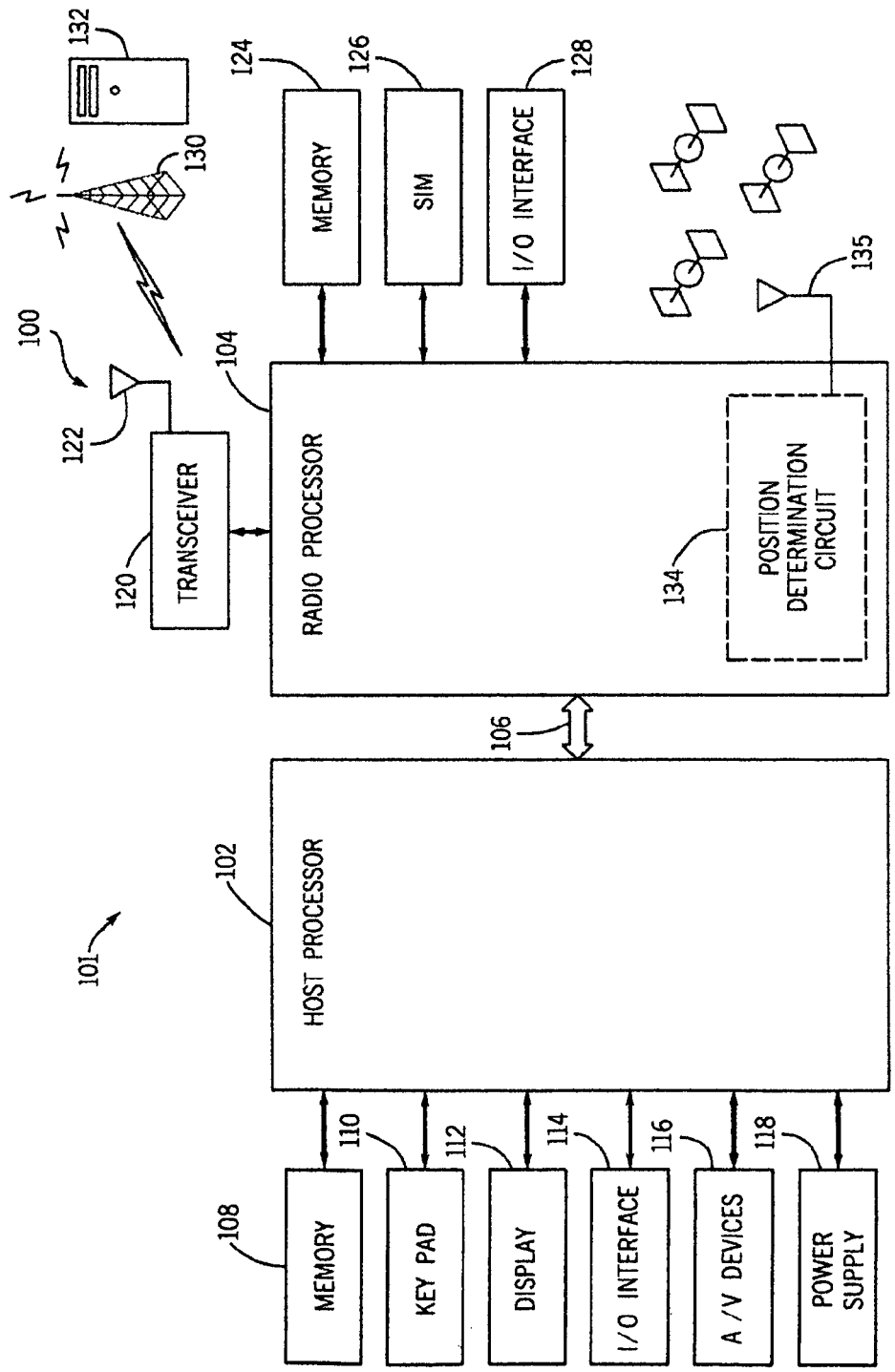
FIG. 4 is a block diagram of the mobile communication device of FIGS. 2 and 3, according to an exemplary embodiment.

As shown in the embodiment of FIG. 4, device 100 may comprise a processing circuit 101 which may comprise a dual processor architecture, including a host processor 102 and a radio processor 104 (e.g., a base band processor). The host processor 102 and the radio processor 104 may be configured to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, shared memory, and so forth.

The host processor 102 may be responsible for executing various software programs such as application programs and system programs to provide computing and processing operations for device 100. The radio processor 104 may be responsible for performing various voice and data communications operations for device 100 such as transmitting and receiving voice and data information over one or more wireless communications channels. Although embodiments of the dual processor architecture may be described as comprising the host processor 102 and the radio processor 104 for purposes of illustration, the dual processor architecture of device 100 may comprise one processor, more than two processors, may be implemented as a dual- or multi-core chip with both host processor 102 and radio processor 104 on a single chip, etc. Alternatively, processing circuit 101 may comprise any digital and/or analog circuit elements, comprising discrete and/or solid state components, suitable for use with the embodiments disclosed herein.

In various embodiments, the host processor 102 may be implemented as a host central processing unit (CPU) using any suitable processor or logic device, such as a general purpose processor. The host processor 102 may comprise, or be implemented as, a chip multiprocessor (CMP), dedicated processor, embedded processor, media processor, input/output (I/O) processor, co-processor, a field programmable gate array (FPGA), a programmable logic device (PLD), or other processing device in alternative embodiments.

The host processor 102 may be configured to provide processing or computing resources to device 100. For example, the host processor 102 may be responsible for executing various software programs such as application programs and system programs to provide computing and processing operations for device 100. Examples of application programs may include, for example, a telephone application, voicemail application, e-mail application, instant message (IM) application, short message service (SMS) application, multimedia message service (MMS) application, web browser application, personal information manager (PIM) application (e.g., contact management application, calendar application, scheduling application, task management application, web site favorites or bookmarks, notes application, etc.), word processing application, spreadsheet application, database application, video player application, audio player application, multimedia player application, digital camera application, video camera application, media management application, a gaming application, and so forth. The application software may provide a graphical user interface (GUI) to communicate information between device 100 and a user.

System programs assist in the running of a computer system. System programs may be directly responsible for controlling, integrating, and managing the individual hardware components of the computer system. Examples of system programs may include, for example, an operating system (OS), device drivers, programming tools, utility programs, software libraries, an application programming interface (API), graphical user interface (GUI), and so forth. Device 100 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Device 100 may comprise a memory 108 coupled to the host processor 102. In various embodiments, the memory 108 may be configured to store one or more software programs to be executed by the host processor 102. The memory 108 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), or any other type of media suitable for storing information.

Although the memory 108 may be shown as being separate from the host processor 102 for purposes of illustration, in various embodiments some portion or the entire memory 108 may be included on the same integrated circuit as the host processor 102. Alternatively, some portion or the entire memory 108 may be disposed on an integrated circuit or other medium (e.g., hard disk drive) external to the integrated circuit of host processor 102. In various embodiments, device 100 may comprise an memory port or expansion slot 123 (FIG. 2) to support a multimedia and/or memory card, for example. Processing circuit 101 may use memory port 123 to read and/or write to a removable memory card having memory, for example, to determine whether a memory card is present in port 123, to determine an amount of available memory on the memory card, to store subscribed content or other data or files on the memory card, etc.

Device 100 may comprise a user input device 110 coupled to the host processor 102. The user input device 110 may comprise, for example, a alphanumeric, numeric or QWERTY key layout and an integrated number dial pad. Device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, a keypad and so forth.

The host processor 102 may be coupled to a display 112. The display 112 may comprise any suitable visual interface for displaying content to a user of device 100. For example, the display 112 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

Device 100 may comprise an input/output (I/O) interface 114 coupled to the host processor 102. The I/O interface 114 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, device 100 may be configured to transfer and/or synchronize information with the local computer system.

The host processor 102 may be coupled to various audio/video (A/V) devices 116 that support A/V capability of device 100. Examples of A/V devices 116 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 118 configured to supply and manage power to the elements of device 100. In various embodiments, the power supply 118 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for device 100. For example, the radio processor 104 may be configured to communicate voice information and/or data information over one or more assigned frequency bands of a wireless communication channel. In various embodiments, the radio processor 104 may be implemented as a communications processor using any suitable processor or logic device, such as a modem processor or baseband processor. Although some embodiments may be described with the radio processor 104 implemented as a modem processor or baseband processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments. Radio processor 104 may be any of a plurality of modems manufactured by Qualcomm, Inc. or other manufacturers.

Device 100 may comprise a transceiver 120 coupled to the radio processor 104. The transceiver 120 may comprise one or more transceivers configured to communicate using different types of protocols, communication ranges, operating power requirements, RF sub-bands, information types (e.g., voice or data), use scenarios, applications, and so forth. For example, transceiver 120 may comprise a Wi-Fi transceiver and a cellular or WAN transceiver configured to operate simultaneously.

The transceiver 120 may be implemented using one or more chips as desired for a given implementation. Although the transceiver 120 may be shown as being separate from and external to the radio processor 104 for purposes of illustration, in various embodiments some portion or the entire transceiver 120 may be included on the same integrated circuit as the radio processor 104.

Device 100 may comprise an antenna system 122 for transmitting and/or receiving electrical signals. As shown, the antenna system 122 may be coupled to the radio processor 104 through the transceiver 120. The antenna system 122 may comprise or be implemented as one or more internal antennas and/or external antennas.

Device 100 may comprise a memory 124 coupled to the radio processor 104. The memory 124 may be implemented using one or more types of machine-readable or computer-readable media capable of storing data such as volatile memory or non-volatile memory, removable or non-removable memory, erasable or non-erasable memory, writeable or re-writeable memory, etc. The memory 124 may comprise, for example, flash memory and secure digital (SD) RAM. Although the memory 124 may be shown as being separate from and external to the radio processor 104 for purposes of illustration, in various embodiments some portion or the entire memory 124 may be included on the same integrated circuit as the radio processor 104. Further, host processor 102 and radio processor 104 may share a single memory.

Device 100 may comprise a subscriber identity module (SIM) 126 coupled to the radio processor 104. The SIM 126 may comprise, for example, a removable or non-removable smart card configured to encrypt voice and data transmissions and to store user-specific data for allowing a voice or data communications network to identify and authenticate the user. The SIM 126 also may store data such as personal settings specific to the user.

Device 100 may comprise an I/O interface 128 coupled to the radio processor 104. The I/O interface 128 may comprise one or more I/O devices to enable wired (e.g., serial, cable, etc.) and/or wireless (e.g., WiFi, short range, etc.) communication between device 100 and one or more external computer systems.

In various embodiments, device 100 may comprise location or position determination capabilities. Device 100 may employ one or more position determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), etc.

In various embodiments, device 100 may comprise dedicated hardware circuits or structures, or a combination of dedicated hardware and associated software, to support position determination. For example, the transceiver 120 and the antenna system 122 may comprise GPS receiver or transceiver hardware and one or more associated antennas coupled to the radio processor 104 to support position determination.

The host processor 102 may comprise and/or implement at least one LBS (location-based service) application. In general, the LBS application may comprise any type of client application executed by the host processor 102, such as a GPS application, configured to communicate position requests (e.g., requests for position fixes) and position responses. Examples of LBS applications include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest (POI) such as restaurants, hotels, landmarks, and entertainment venues, and other types of LBS services in accordance with the described embodiments.

Radio processor 104 may be configured to invoke a position fix by configuring a position engine and requesting a position fix. For example, a position engine interface on radio processor 104 may set configuration parameters that control the position determination process. Examples of configuration parameters may include, without limitation, location determination mode (e.g., standalone, MS-assisted, MS-based), actual or estimated number of position fixes (e.g., single position fix, series of position fixes, request position assist data without a position fix), time interval between position fixes, Quality of Service (QoS) values, optimization parameters (e.g., optimized for speed, accuracy, or payload), PDE address (e.g., IP address and port number of LPS or MPC), etc. In one embodiment, the position engine may be implemented as a QUALCOMM® gpsOne® engine.

Figure 5:
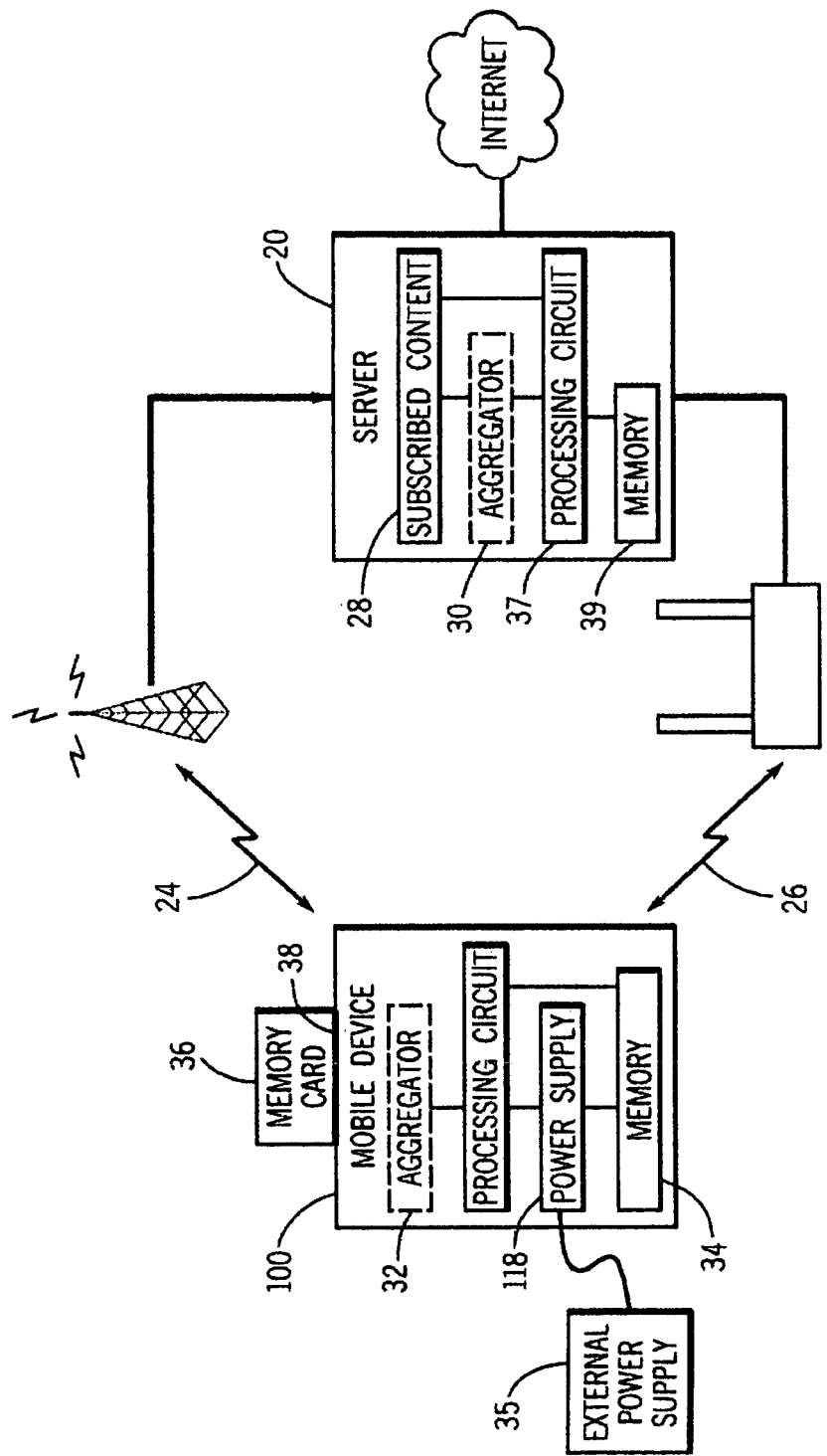
FIG. 5 is a block diagram of a system and method of accessing subscribed content with a mobile computing device, according to an exemplary embodiment.

With reference now to FIG. 5, mobile computing device 100 may be used to access subscribed content on a remote server 20 via a wireless network 24, 26. Subscribed content is data published by a content provider to which a user has subscribed or may subscribe in order to receive updated content. Subscribed content 28 includes web casts (e.g., podcasts such as video, audio, and still photo data), data provided in a web feed format, such as RSS (Really Simple Syndication), RDF (Resource Description Framework), OPML (Outline Processor Markup Language), the Atom Syndication Format or other markup language formats, such as hypertext markup language (HTML) or extensive markup language (XML). Subscribed content may include news feeds, blogs, school information, podcasts, cached web pages, etc., and may include enclosures in an enclosed file format or other code pointing to media files (e.g., audio, video, photo, etc.). Subscribed content or updated subscribed content may be referred to as episodes, publications, volumes, numbers, editions, etc. Subscribed content may be described as being "pulled" from a content source using an aggregator or other mechanism as described below, as opposed to being "pushed" as with e-mail and instant messaging, though in alternative embodiments subscribed content, too, may be pushed, for example to an internet aggregator. Subscribed content does not include conventional e-mails in this embodiment, though in alternative embodiments, the teachings herein may be applied to e-mails and other content which is not subscribed content. Subscribed content may be updated periodically or from time to time by the associated content provider or a third party. Subscribing to a web feed or other source of subscribed content may be accomplished by a user registering or subscribing with a content provider, for example via the content providers web site, which may in one embodiment comprise dragging a link from a web browser to an aggregator, or clicking an icon (e.g., an RSS icon), etc.

An aggregator 30, 32 (or feed reader, news reader, etc.) is an application or other module which collects web feeds or other subscribed content to make the subscribed content more easily accessible to a user. One exemplary aggregator is Bloglines, a division of Ask.com, produced by IAC Search & Media, Oakland, Calif. Aggregator 30, 32 may be operable on one or both of mobile device 100 and server 20. Aggregator 30, 32 may be configured to query all servers in a user's preselected list of web feeds or subscribed content sources (e.g., feed list) to check for new subscribed content. The checking may occur periodically (e.g., every 30 minutes, once a day, etc.) or from time to time and preferably occurs on a predetermined period or time schedule. If new content exists, aggregator 30, 32 may make a note of the new content, for example by setting a flag or downloading a new web feed summary or link, or aggregator 30, 32 may download or synchronize with part or all of the subscribed content or a summary of the subscribed content.

Mobile computing device 100 is configured to access subscribed content 28 via a wireless WAN 24, wireless LAN 26, and or other wired or wireless networks. Subscribed content 28 may be accessed by streaming content from server 20 to device 100, which is the presentation of the content to the user while the data is downloading, typically with a portion of the content stored or cached on device 100. Subscribed content 28 may alternatively be accessed by downloading content from server 20 to device 100, which is the reception and storage of the subscribed content on device 100. In either case of streaming or downloading, resources of device 100, such as one or more of battery power, memory space, processing bandwidth and wireless network bandwidth, are used.

Figure 6:
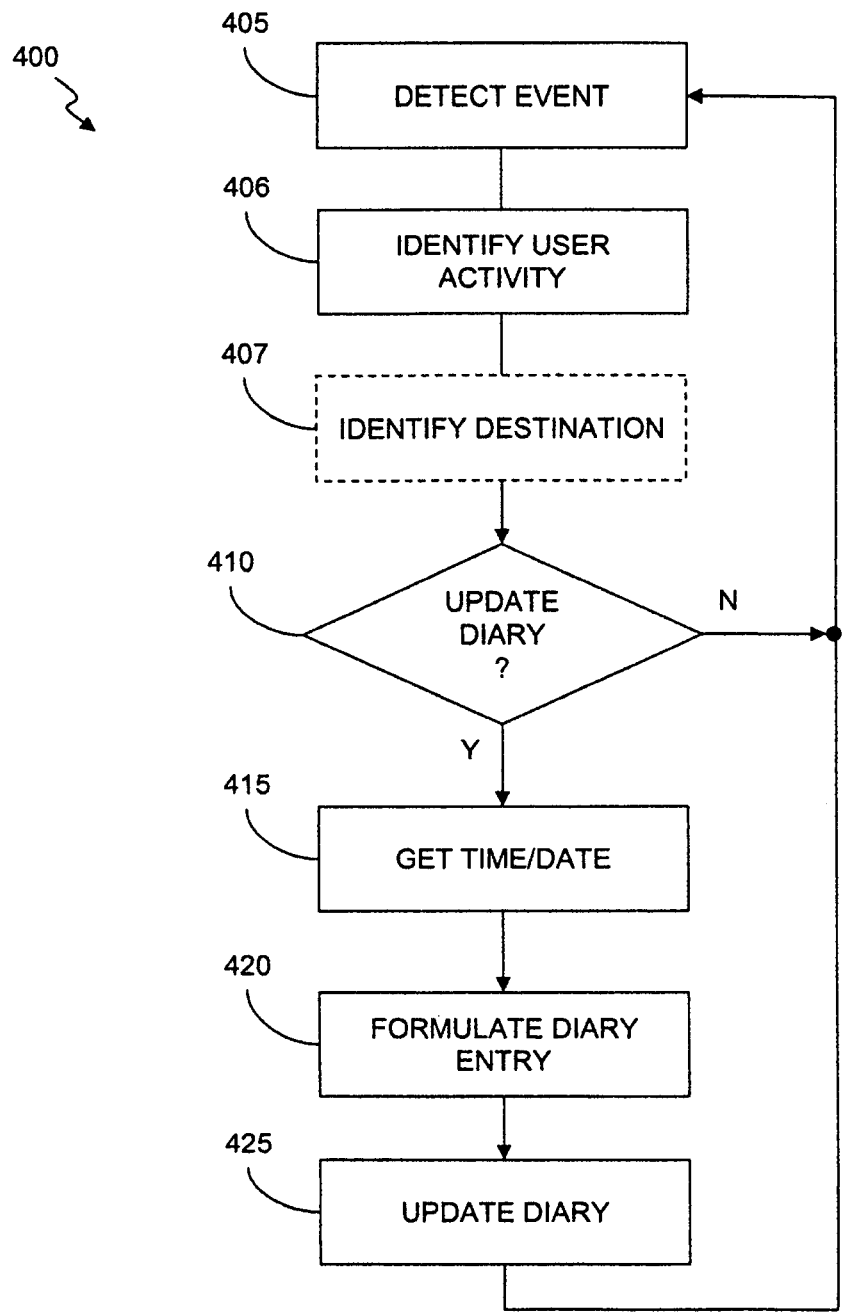
FIG. 6 is a flowchart illustrating a system and method of generating diary entries for a user of the wireless portable electronic device, according to an exemplary embodiment.

Referring now to FIG. 6, a flowchart illustrating a system and method 400 of generating diary entries for a user of the wireless portable electronic device is shown. In the exemplary embodiment, an event generated by the wireless portable electronic device is monitored or otherwise detected at step 405. Such monitoring or detection may occur through observing output from one or more of several event-generating device subsystems or applications. At least some of the detected events are indicative of an activity of the device user. For example, at least one event may be generated in response to an activity of a user of the wireless portable electronic device.

Detected events are interpreted to identify at step 406 a user activity, when appropriate, that is related to the detected event. Table 1 identifies several exemplary detectable events and their respective user activities. In some embodiments a determination is made at step 410 as to whether to update the user diary based on the monitored user activity. Not all user activity may result in generation of a new input into the user diary. For example, in a device equipped with a GPS receiver and application to measure a user's position, not every new GPS location event would necessarily generate a diary input. Nor would every email communication, or web browsing activity necessarily result in generation of a diary input. If it is determined that the diary should be updated, timing information of the related user activity may be obtained at step 415, otherwise, the process returns to step 405 for continued monitoring or detecting of additional events. Association of the identified activity with some form of time and date information is provided for arranging diary records in a meaningful way.

TABLE 1

Exemplary Events & Related User Activities

| Event | Supplemental Information | Activity | Details |
|---|---|---|---|
| Power On | Time of day | User awake | Wake time |
| Power Off | Time of day | User sleeping | Sleep time, sleep duration |
| Motion | — | User is mobile | — |
| Motion | GPS | User is exercising, walking, traveling by car, train, etc. | Type of exercise, mode of travel |
| Email received/sent | Addressee, message content | User purchased item, scheduled travel, etc. | item purchased, schedule of travel |
| Phone call | caller ID, phone book | phone call | work, social |
| Calendar | — | User's scheduled activity | work, social |
| Web browsing | — | online shopping, online research, etc. | items purchased, research subject matter |
| MP3 | — | User relaxing | genre, artist, title, etc. |

After acquiring timing information, a diary entry is formulated at step 420. Formulation of the diary entry generally includes selecting or otherwise generating a descriptor for the identified activity. Such a descriptor may be a textual description or abbreviated description of the underlying activity. In some embodiments, the descriptor can be obtained at least in part from the detected event itself. For example, a descriptor for a detected incoming telephone call from Mr. Jones may include "Received Call from Mr. Jones." The "Received Call" portion of the descriptor could be derived from an event, such as a "call answered" signal prompted by the incoming call itself. The calling party, "Mr. Jones" may be identified from supplemental information, such as caller ID associated with the call, or from the user's phone book or contacts list.

Timing information, such as one or more of a time that the call was initiated or answered, a time the call was concluded, and a duration of the call can be obtained from a timing source, allowing a diary entry to be displayed in a time relevant manner. The diary can then be updated at step 425 to reflect the formulated entry identifying the user activity and its association with time values, such as a start time, a stop time or duration. The diary entry may include a description, an associated time, and in some instances, some other indicia, such as graphics to provide the user with a user-comprehendible representation of the diary entry.

In at least some embodiments, additional processing is accomplished to infer or conclude a user activity based upon the detected event. Such additional processing may be necessary when identification of the user activity is not readily apparent from a detected event. For example, a motion sensor may produce a detectable event, such as an electrical signal or a digital word, in response to user motion. In some embodiments, the motion detector output is binary, indicating whether the device and thus the user is mobile or stationary. Alternatively or in addition, the motion sensor output is variable responsive to a feature of the motion, such as its frequency or intensity. The variability may be captured in value or variation of an electrical signal or digital word.

In some embodiments, an inference or conclusion of the user's activity, such as jogging, may be obtained by a motion sensor output event signal indicating motion of the device and thus the user occurring above a certain amplitude or having some other attribute, such as a periodicity indicative of jogging. In some embodiments, such as a binary motion detector, a user activity of walking and jogging may each produce the same detectable event. Thus, there is no particular feature of the motion detector suggestive of whether the motion relates to jogging. Such an inference or conclusion as to the user's motion can be based on one or more other event sources, such as a position sensor. For example, a speed can be calculated based on changes in the device's and thus the user's position over some sample time interval. A user velocity can thus be determined, which can be suggestive of whether the underlying activity is jogging, sprinting, or walking. If the velocity is too fast, a different conclusion may be determined, such that the user is traveling by car or bicycle.

Figure 7:
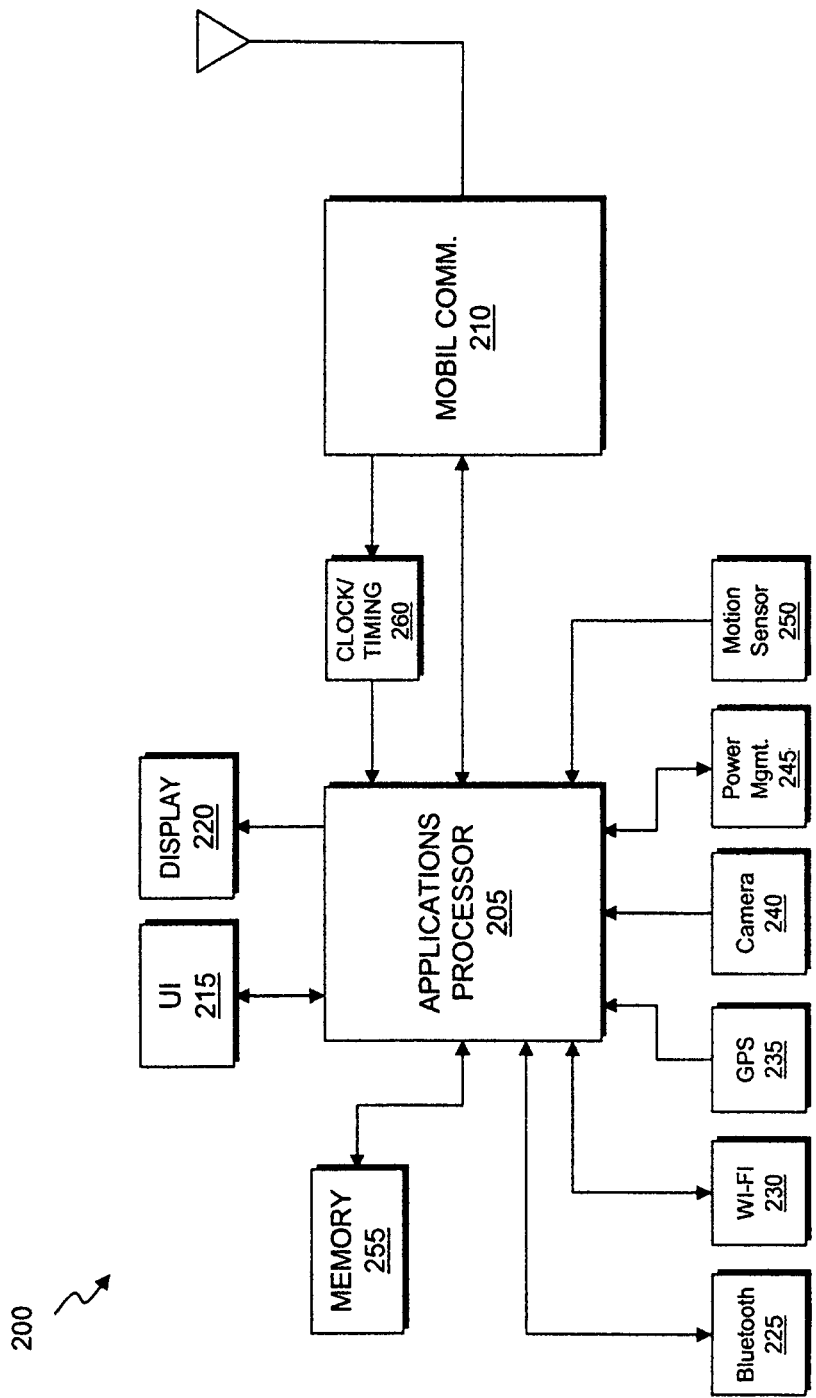
FIG. 7 is a block diagram of an exemplary wireless portable electronic device, according to an exemplary embodiment.

Referring now to FIG. 7, a block diagram of an exemplary wireless portable electronic device 200 is shown, including an applications processor 205 and a mobile communications processor 210. The mobile communications processor 210 provides communication support functionality that may be similar in at least some regards to the radio processor 104 and transceiver 120 shown and described in relation to FIG. 4. The applications processor 205 provides processing support for one or more applications usable by the device 200. Preferably, at least some of the one or more applications provide detectable events indicative of an activity of a user of the device 200.

In more detail, the application processor 205 is in communication with one or more system elements, or subsystems, that each alone or in combination initiates at least one detectable event that may be indicative of an activity of a user of the device 200. For example, the application processor 205 is in communication with on or more networking communication processors that may be implementing wireless networking protocols, such as Bluetooth® 225 and WiFi 230. An exemplary detectable event initiated by such networking communication processors 225, 230 would include messages sent or received by the user. Examples of other such system elements that initiate detectable events relating to an activity of a user of the device 200 include position determining devices, such as a GPS receiver 230 or other system elements configured to implement any of the position determination techniques, such as those described above in relation to FIG. 6. In such instances, an event would include determination by such a GPS receiver 230 of a current position, or change of position of the device 200, suggesting a position or change of position of the user of the device 200.

Still other system elements adapted to generate detectable events in response to user activity include multimedia devices, such as one or more digital still cameras 240 and digital video cameras. Detectable events would include media recorded or played back from such devices 240. Still further system elements that initiate an event related to an activity of a user of the device 200 include one or more device sensors configured to sense some physical attribute associated with the wireless portable electronic device 200. In the exemplary embodiment, such physical sensors include a power monitor 245 configured for sensing status of the system power and providing an indication (i.e., initiating an event) reflecting a change in power status. Such indications of changes in power status may include power on, power off, and charging.

Yet another class of physical sensors includes motion sensors 450. Exemplary motion sensor 450 may include one or more of an accelerometer, a magnetometer, a gyroscope, a position sensitive switch, such as a mercury switch. When the device is in motion, as may result from user motion while holding the device 200, some aspect of the motion is detectable by the motion sensor 250, which is configured to provide an output (i.e., initiating an event) indicative of the motion detected. The wireless portable electronic device 200 also typically includes other standard system elements, such as system memory 225, a user interface 215, a user display 220, and a timer 260.

In some instances, a single user activity may result in the initiation of events among one or more system elements of the device 200. The device can be configured to identify and classify detection of events in order to identify the corresponding activity of the user. For example, if a user accesses the Internet through a WiFi hotspot, messages (i.e., events) observable through the WiFi application interface first identify that a user is engaging in a WiFi session. From the content of the messages, or some other attribute of a related communications protocol, such as a wireless access port address, the particular WiFi hotspot being accessed can be identified and serve as an indication of a location of the user (i.e., a user must be within the local region of an identified WiFi hotspot).

In addition to a user's location, it may be possible to infer other aspects of the user's activity. For example, if a user accesses a WiFi hotspot at a particular coffee shop, it is possible to infer from the identified WiFi hotspot that the user is taking a coffee break, while accessing the Web. Depending upon the duration of the WiFi session and the nature of activity over the WiFi network (e.g., obtainable by monitoring or otherwise tracking web sites visited by the user during the particular WiFi session), it may be possible to distinguish whether the user is working, or perhaps engaging in online shopping. In some instances, a position can also be determined through the GPS receiver 235. When combined with activity on a WiFi hotspot, such supplemental position information can be used to more precisely locate the user during the course of the observable activity.

Figure 8:
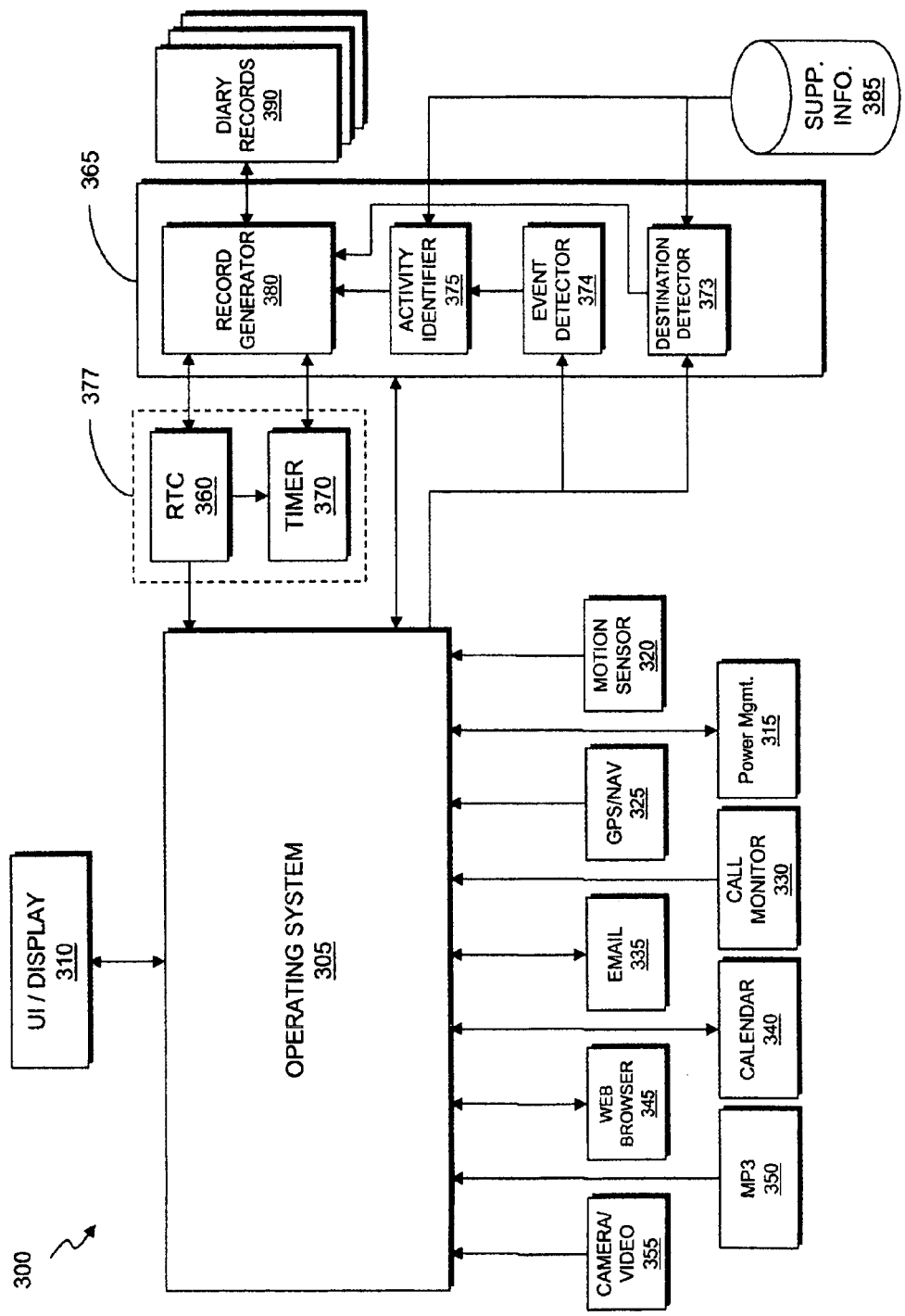
FIG. 8 is a functional block diagram of various processes available to the exemplary wireless portable electronic device of FIG. 6, according to an exemplary embodiment.

Referring next to FIG. 8, a functional block diagram illustrates various processes available to an exemplary wireless portable electronic device 300, such as the device 200 of FIG. 6. The wireless portable electronic device 300 generally includes an executive program, such as an operating system 305 and a user interface 310. The operating system 305 coordinates sharing of system resources among one or more of the various processes. In the exemplary embodiment, the operating system 305 is in communication with a power management application 315, a motion sensor controller 320, a position determining application, such as a GPS application 325, a telephone application 230, an e-mail application 235, a calendar application 340, a web browsing application 345, and multimedia applications, such as an MP3 player application 350 and an imaging application, such as a camera controller 355.

Activity associated with a user of the device 300 may result in one or more detectable events being generated among one or more of the various applications. For example, turning the wireless portable electronic device 300 on or off produces a change in power status, such change being detectable by the power management application 315 (e.g., measured through the power management sensor 245, FIG. 7). Thus, the power management application 315 may detect and distinguish between a power-on and a power-off event. Either event is indicative of a user activity of turning the device 300 on or off, as the case may be.

Continuing with exemplary detection of events related to user activity, a user's location can be detected through a position sensor 235 (e.g., GPS receivers or other position determining devices), FIG. 7. The position sensor 235 may produce a digital output word indicative of a solution or position fix of the devices' and therefore the user's geographic location (e.g., x, y, z values). The digital output word would be detectable (i.e., readable) by the GPS application 325. In some embodiments, a destination can be inferred from the user's location. This can be accomplished by identifying the user's location on a map. The map may include a street map for identifying street addresses, or a business location map for identifying businesses within a vicinity of a particular location. In some embodiments, such maps may be stored locally within the device 300. Alternatively or in addition, such maps may be obtained from a remote source, such as a web-accessible source.

A voice calling application 230 may initiate detectable events in response to calls placed and received by a mobile telephone of the device 300. One or more features of a call event may identify the occurrence of a call, whether the call is incoming or outgoing, the remote party's phone number, and the call's duration. Supplemental information, such as identification of the remote party through caller ID and/or a user's contact list or phone book can be used to identify the remote party. Still further refinement of the user activity associated with a particular call can be accomplished through an inference as to whether a call is business related or personal. Such inferences can be achieved through pre-classification of certain remote phone numbers and/or remote party identification, time of day, day of week, etc. For example, a call to the user's office would be classified as business, as would a call to pre-classified clients or business partners, as may be identified by their respective phone number and/or identity. Other calls could be classified as personal, determined in a similar manner.

An e-mail application 235 may initiate detectable events in the form of email messages sent and received by the device, as well as email messages generated and read by the user. Such activity of the e-mail application 235 may suggest the user is actively engaging in email communications (an activity in and of itself). Other features detectable by the email application 235 may process content of the email messages to determine a user event. Such email content may include one or more of the addressees, subject line, message body, and attachments. Address fields can be used to distinguish messages, such as messages that are work-related from messages that are non-work related.

In some embodiments, email messages sent to or received from certain addresses can be identified for further processing to glean additional information related to user activity. For example, messages related to a particular user activity, such as confirmation of a user bid placed on an online auction service, such as EBAY®, confirmation of an online purchase, such as messages from AMAZON®, or messages confirming travel arrangements, such as messages from TRAVELOCITY®, may be inspected for further details. Content from such messages, can be inspected for details related to the underlying transaction. Such details may include identification of a purchased item and cost.

The calendar application 340 provides access to the user's stored calendar entries. Such entries would be readable through the calendar application 340, as may be accomplished at various times throughout a given day. Reading of such calendar entries may represent a detectable event. The content of such read entries would be indicative of the user's activity at the scheduled date and time. In some embodiments, calendar entries can be retrieved at one time for more than one day, e.g., once a week, or once a month. Appropriate diary entries would be formulated for the scheduled activity at the proper scheduled date and time. Such multi-day reviews of the user's calendar can be repeated and any changes to future items updated according to any update schedule as may be necessary. For example, a new calendar entry could prompt generation of a related diary entry for the associated scheduled user activity. With a calendar, such detectable events would generally be indicative of planned activity and not necessarily of the user's actual activity.

Still further applications capable of producing detectable events indicative of user activity include web browsing application 345. Such routine user actions as may occur in the course of web browsing represent the events indicative of a user activity. Thus, a user's browsing activity, such as uniform resource locators entered by the user, the identity of hyperlinks followed by the user, and even in some instances web page content viewed by the user can suggest a user activity. For example, a user may be conducting research of a particular topic as determined from keywords entered in a search engine, such as GOOGLE®. Alternatively or in addition, events include user transactions carried out at such web sites. For example, the web browsing application 345 can detect a user placing a bid on www.ebay.com, making a purchase on www.amazon.com, booking an airline flight on www.expedia.com, etc. Such browsing events (e.g., pages visited and transactions conducted thereon) would be indicative of the user's activity at the time of the browsing.

Still other events can be detected through multimedia applications, such as the MP3 player application 350 and the camera controller 355. Events detected by these applications 350, 355 include retrieval of content, such as playing of MP3 audio. The activity might include listening to music, watching a video, and/or taking a picture. Additional details, such as the subject matter viewed during any such viewing session of multimedia can be included in a diary entry, such as identification of one or more of a genre, a title, and an artist.

The wireless portable electronic device 300 also includes a diary engine 365 in communication with the operating system 305 and configured for generating diary entries responsive to events indicative of user activity, and recording the diary entries into user readable diary records 390. In some embodiments, the diary engine 365 includes a physical processor. Alternatively or in addition, the diary engine 365 is implemented as a process, such as a collection of preprogrammed steps, on a processor of opportunity, such as a central processor. In some embodiments, the diary engine 365 is implemented within the wireless electronic portable device. Alternatively or in addition, the diary engine 365 is implemented on a remote processor in communication with the wireless electronic portable device, such as a server communicating with the device in a client-server relationship.

In some embodiments, the diary engine 365 is in communication with one or more of the event detecting applications through the operating system 305. Alternatively or in addition, the diary engine 365 is in direct communication with one or more of the event detecting applications. The diary engine receives indications of user activity through events detected by the one or more applications. The diary engine 365 is configured to monitor detected events, and to generate diary entries responsive to at least some of the detected events. The diary entries may be generated selectively and are indicative of user activity at corresponding times. The diary entries or records are captured, or recorded in a user-retrievable form, such as user diary file 390. The diary file may be a text file, an image, a binary file, or in generally, any suitable file that is able to record such entries in a user retrievable manner.

In the exemplary embodiment, the diary engine 365 includes at least an event detector 374, an activity identifier 375, and a diary record generator 380. The event detector 374 can be in communication with the operating system 305.

Alternatively or in addition, the event detector 374 can be in communication with one or more of the various applications associated with user activity. The activity identifier 375 operates upon detected events received or otherwise identified by the event detector 374. In some embodiments, the activity identifier 375 examines parameters associated with detected event to identify related user activity. Alternatively or in addition, the activity identifier 375 receives supplemental information, which it uses in combination with parameters associated with the detect event to identify a related user activity.

The activity 375 identifier can be in communication with a supplemental information source 385. Supplemental information sources 385 can include one or more of web accessible information and locally stored information. Examples of such supplemental information include caller ID and contact list information as discussed herein for use in relation to telephone calls. Other examples of such supplemental information include street maps, as may be used in conjunction with a GPS receiver to place a user's location at a particular street or address. Alternatively or in addition, the supplemental information may include information obtained from GOOGLE Maps, identifying one or more businesses associated with a location obtained from a GPS positional solution event. For example, if a user dines at a restaurant, a GPS location of the device obtained during such time period can be input into GOOGLE Maps to identify one or more businesses in the immediate vicinity of the user's location. Time of day can also be used as supplemental information to reduce or eliminate ambiguity. For example, if a user is determined to be at a location for which there is more than one business, but only one dining establishment, the activity identifier 375 would identify the activity as eating and not shopping if the time coincides with a common meal time or the user's learned or otherwise identified eating habits.

In some embodiments, the device 300 includes a timer 372. The timer 372 may include a real time clock 360, or other suitable timer configured to track time of day. Alternatively or in addition, the device 300 also includes an elapsed timer 370 configured to measure a time period from a reference time. In some embodiments, the elapsed timer is, in communication with the real time clock 360. Elapsed timer may be controllable to measure the time period between two identified times of the real time clock 360.

In some embodiments, the diary engine 365 also includes a destination detector 373. The destination detector can be configured to determine a user destination based on one or more detected events of the device 300. The destination detector 373 may receive a location from the device's GPS/NAV 325 capability. The destination detector 373 can use the determined position to identify a particular location, such as a street address and/or a business location by consulting supplemental information 385, such as a suitable destination database. One or more of the destination detector 373, the event detector 374, the activity identifier 375, and the record generator 380 can be implemented in hardware, software, or a combination of hardware and software.

By way of an illustrative example, a user carrying the device 30 undertakes a jogging activity. The motion sensor 320 generates an event indicative that the device 300 is in motion. The event detector 374 receives the signal from the motion sensor application (i.e., step 405) and forwards it to the activity identifier 375, which in turn, determines that an indication that a user activity of jogging is occurring (i.e., step 406). Upon initiation of such jogging motion, the record generator 380 may determine that the diary should be updated to reflect a new activity (i.e., step 410). The diary record generator 380 obtains timing information from the real time clock 360 (i.e., step 415) and formulating a diary entry by generating an association between the jogging activity and the start time (i.e., step 420). The diary may be updated at that time indicating that jogging activity started (i.e., step 425). Alternatively, the diary entry may not made until the user activity has concluded. At that time, output from the motion sensor 320 stops or at least no longer indicates jogging. Thus the activity identifier 375 also observes cessation of the jogging activity. The record generator 380 receives output from the activity identifier 375, observing that the jogging activity has terminated. At that time, an end time can be obtained from the real time clock (in some embodiments, an elapsed timer is started upon initiation of the jogging and terminated upon cessation of the activity, such that the record generator 380 receives an elapsed time for the activity. Ultimately, a diary record indicative of jogging is formulated by the record generator 380 beginning at the corresponding time and lasting for the corresponding interval. The record generator 380 may include a destination of the jogging, when so provided by the destination detector 373, such as identifying a job through a park, or around the user's neighborhood. The record generator 380 updates the diary 390 to reflect the activity.

Figure 9:
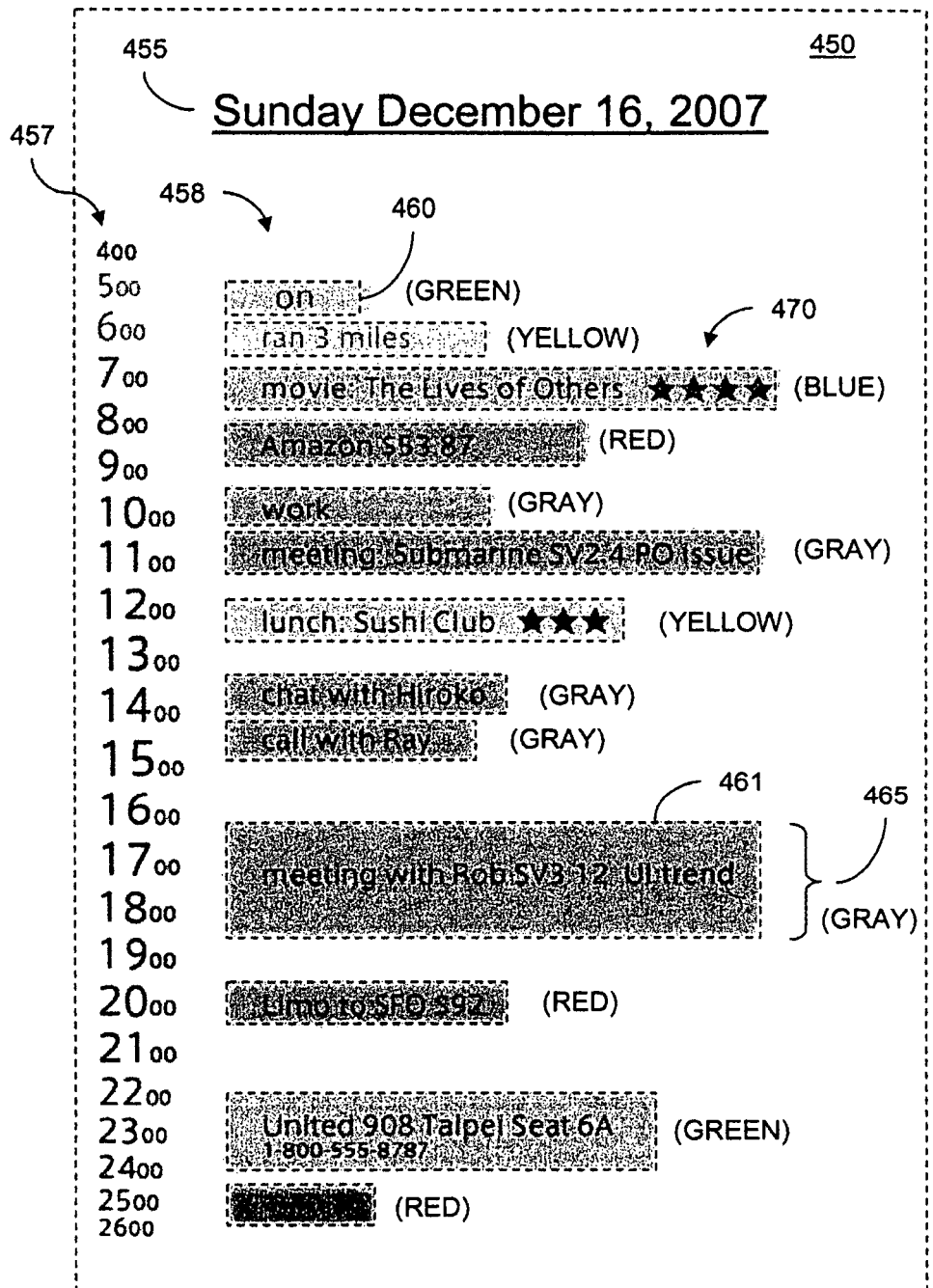
FIG. 9 is an exemplary user-readable display of exemplary electronic diary entries for one day, according to an exemplary embodiment.

An exemplary user-readable display of exemplary electronic diary entries for one day is illustrated in FIG. 9. The exemplary diary 450 reflects a portion of a single day. A date 455 is included, for example in a header portion of the diary to identify which date of the diary is being viewed. The exemplary diary 450 is configured as a table having a first column of times (e.g., hours of the day), and an adjacent second column of text entries 458. The text entries 460 are indicative of a user activity and are adjacent to times of the day during which the identified user activity took place. The text entries 460 provide some indication as to the related activity, such as a textual description, or abbreviation. At least some of the text entries 461 are presented on a shaded field. In the exemplary embodiment, the shaded field extends horizontally to cover the textual input, and vertically corresponding to a duration of the corresponding user activity. In the exemplary activity "meeting with Rob . . . " the vertical extent 465 of the color field extends from about 16:00 to about 18:00 (i.e., about 2 hours). In some instances, two or more user activities may overlap, such as talking on a cell phone while exercising. Such diary entries may be displayed side by side, or otherwise overlapping as determined by their respective time values.

The shaded fields, when provided, can be color coded and or shaded in order to distinguish various different activities from each other at a glance. In the exemplary diary 450, the fields are colored. However, since a gray scale representation is included, the colors of the associated fields are indicated in parenthesis next to each of the fields. The exemplary colors range from green, yellow, red, and gray. Other colors, shades, textures, or other indicia, such as colored text and/or borders may also be employed.

In the exemplary embodiment, the diary 450 includes a first activity 460 of power on at a time of about 8:00. The diary record was generated automatically in response to the device being powered on in the morning. A second entry occurring from about 5:00 to about 6:00 indicates that the user went jogging. Next, the user rented a movie at about 7:00. Included with the record entry is a title of the movie and a star indication obtained from external review of the movie. The diary also includes an entry at about 9:00 documenting an online purchase with AMAZON®. Along with a description of the user activity associated with the transaction is an indication of the online store and cost. Other entries are included throughout the day, until a final entry of about 25:00 (i.e., 01:00 AM the following morning).

In some embodiments, an analyzer is provided to analyze diary records and provide the user with additional, helpful information. Such information may be in the form of summary reports. Such reports may provide a summary of habitual activities, such as sleep-wake patterns, exercise routines. Such reports may also provide a summary of eating habits, such as eating times and types of food; percentage of annual travel; expenditures; or entertainment.

In some embodiments, a scheduler assistant is provided to update a user's calendar automatically. Such automatic updates may be initiated according to an online purchase, such as purchase of concert tickets for a particular show, concert, or sporting event. The scheduler assistant places an event on user's calendar corresponding to date and time of actual show, concert, or sporting event.

In some embodiments, the scheduler assistant may suggest certain activities in advance of a scheduled event, given a current location and time, and a scheduled destination and event time. For example, the scheduler assistant can propose transportation options, such as train schedule, calling a cab, or even proposing travel route. For online purchases, the scheduler assistant may synchronize with email to review confirmation email. Thus, the scheduler assistant can automatically enter scheduled delivery date into calendar and even track delivery as supplemental tracking email messages are received. With any of such features, the user can be provided with an ability for opting into and out of any such feature, as may be desired.

In some embodiments, the device includes at least one of a pre processor and post processor. A preprocessor processes diary records prior to recording such record into the diary 450. In some embodiments, the preprocessor is implemented automatically using pre-programmed logic. Alternatively or in addition the preprocessor is implemented manually. Pre-processing can be accomplished to identify the records, etc.

The embodiments disclosed herein have been described with reference to block diagrams and flow diagrams. Each block may represent one or more computer programs (e.g., software, firmware, etc.) and/or the hardware or processing circuitry on which the computer programs operate (e.g., microprocessors, microcontrollers, applications-specific integrated circuits, programmable logic, programmable gate array, etc.). Each block may be a module and may refer to either computer program and/or circuit components operating the computer program to carry out the functions described herein. Blocks may interface with other blocks at a hardware and/or computer program level, and may operate at and/or interface with other modules at any applicable computer program level specified in the Open Systems Interconnection (OSI) model, such as application layer, presentation layer, session layer, transport layer, network layer, data link, physical layer, etc. Modules may be represented by a block, multiple blocks or portions of blocks in the various figures herein. The recitation of a module, computer, server, or other unit in the specification (including claims) hereof is meant to include the use of multiple units or partial units configured to operate as the unit is described.

While the exemplary embodiments illustrated in the figures, and described above are presently exemplary, it should be understood that these embodiments are offered by way of example only. Accordingly, the present invention is not limited to a particular embodiment, but extends to various modifications that nevertheless fall within the scope of the appended claims.

What is claimed is:

1. A method for generating a personalized electronic diary for a user of a wireless device, the method being performed by one or more processors of the wireless device and comprising:
    detecting a motion of the wireless device;
    in response to detecting the motion, initiating a timer and receiving location information of the wireless device from a global positioning system (GPS) receiver;
    determining, at least in part, from the motion and the location information, a related activity of the user in using the wireless device;
    monitoring for a cessation of the motion of the wireless device, wherein the cessation of the motion corresponds to an end to the related activity, and wherein cessation of the motion causes the timer to cease;
    selectively updating the personalized electronic diary by:
        making a determination, based at least in part on the determined related activity, whether to update the personalized electronic diary with a personalized diary entry corresponding to the related activity;
        updating the personalized electronic diary, based on the determination, by generating the personalized diary entry that identifies the related activity of the user and an elapsed time of the related activity; and
    displaying the personalized diary entry as part of the personalized electronic diary on a display of the wireless device.

2. The method of claim 1, wherein determining the related activity is perform in response to receiving at least one of an electrical signal or a digital word, wherein at least one of the electrical signal or the digital word is transmitted in response to the detected motion.

3. The method of claim 1, wherein determining the related activity of the user comprises formulating an inference as to a most likely user activity from among a plurality of possible user activities.

4. The method of claim 1, wherein the detected motion corresponds to a periodic acceleration of the wireless device, and wherein the related activity corresponds to an exercise activity.

5. The method of claim 4, further comprising calculating a velocity of the user over a sample time interval, wherein determining the related activity of the user is further based on the calculated velocity.

6. The method of claim 1, further comprising enabling the user to review and edit the personalized electronic diary.

7. The method of claim 1, wherein determining the related activity of the user is further based on past personalized diary entries.

8. The method of claim 1, further comprising determining a destination of the user of the wireless device based, at least in part, on the location information of the wireless device.

9. The method of claim 8, further comprising obtaining map data from a remote networked resource, wherein determining the destination includes using at least the location information of the wireless device and the map data.

10. The method of claim 1, further comprising associating, in the generated personalized diary entry, the identified user activity with a date and a time representative of a date and a time attributable to the user activity.

11. The method of claim 10, further comprising generating, as a part of the personalized diary entry, a user-readable representation of the association between the date, the time, and the elapsed time, versus the identified user activity.

12. A mobile communications device for maintaining a personalized electronic diary, comprising:

an activity sensor to detect a motion of the mobile communications device;

a timer in communication with the activity sensor, the timer to initiate in response to the activity sensor detecting the motion;

a global positioning system (GPS) receiver to receive location information of the wireless device in response to the activity sensor detecting the motion;

an activity identifier in communication with the activity sensor, the activity identifier to determine, from the motion and the location information, a related activity of the user in using the mobile communications device; and a sensor monitor coupled to the timer, the sensor monitor to monitor for cessation of the motion of the mobile communications device, wherein the cessation of the motion corresponds to an end to the related activity, and wherein cessation of the motion causes the timer to cease;

a diary record generator in communication with the activity identifier, the diary record generator to selectively update the personalized diary by:

making a determination, based at least in part on the determined related activity, whether to update the personalized electronic diary with a personalized diary entry corresponding to the related activity; and updating the personalized electronic diary, based on the determination, by generating the personalized diary entry that identifies the related activity of the user and an elapsed time of the related activity; and a display for displaying the personalized diary entry as part of the personalized electronic diary.

13. The mobile communications device of claim 12, wherein the at least one activity sensor is configured to transmit at least one of an electrical signal or a digital word to the activity identifier in response to detecting the motion of the mobile communications device.

14. The mobile communications device of claim 12, wherein the activity identifier is configured to formulate an inference as to a most likely user activity from among a plurality of possible user activities.

15. The mobile communications device of claim 12, wherein the activity sensor is configured to detect a periodic acceleration of the mobile communications device indicative of an exercise activity.

16. The mobile communications device of claim 15, wherein the activity identifier is configured to calculate a velocity of the user over a sample time interval, and wherein determining related activity of the user is further based on the calculated velocity.

17. The mobile communications device of claim 12, wherein the diary record generator enables the user to review and edit the personalized electronic diary.

18. The mobile communications device of claim 17, further comprising a prediction processor in communication with the position sensor, the GPS receiver, and the activity identifier, the prediction processor to determine a destination of the user during the related activity based, at least in part, on the location information of the mobile communications device.

19. The mobile communications device of claim 18, wherein the prediction processor is configured to access map data from a remote networked resource, and wherein the prediction processor is further configured to determine the destination of the user during the related activity using at least the location information and the map data.

20. An apparatus for creating a personalized electronic diary for a user of a wireless computing device, the apparatus comprising:

means for detecting a motion of the wireless computing device;

means for initiating, in response to detecting the motion, a timer;

means for receiving, in response to detecting the motion, location information of the wireless device from a global positioning system (GPS) receiver;

means for determining, at least in part, from the motion and the location information, a related activity of a user in using the wireless computing device;

means for monitoring for a cessation of the motion of the wireless device, wherein the cessation of the motion corresponds to an end to the related activity, and wherein cessation of the motion causes the timer to cease;

means for selectively updating the personalized electronic diary by:

making a determination, based at least in part on the determined related activity, whether to update the personalized electronic diary with a personalized diary entry corresponding to the related activity; and updating the personalized electronic diary, based on the determination, by generating the personalized diary entry that identifies the related activity of the user and an elapsed time of the related activity; and means for displaying the personalized diary entry as part of the personalized electronic diary on a display of the wireless computing device.

\* \* \* \* \*